United States Patent [19]
Wojcik

[11] 3,748,603
[45] July 24, 1973

[54] SURFACE WAVE FILTER WITH REFLECTION SUPPRESSION

[75] Inventor: Thomas J. Wojcik, Elk Grove Village, Ill.

[73] Assignee: Zenith Radio Corporation, Chicago, Ill.

[22] Filed: Mar. 27, 1972

[21] Appl. No.: 238,544

[52] U.S. Cl. .................... 333/72, 310/9.7, 333/30 R
[51] Int. Cl. .......................... H03h 9/14, H01v 7/02
[58] Field of Search ............................ 333/30 R, 72; 310/9.7, 9.8

[56] References Cited

UNITED STATES PATENTS 3,573,673 4/1971 DeVries ............................ 333/30 R
3,662,293 5/1972 DeVries ............................ 333/30 R

*Primary Examiner*—Rudolph V. Rolinec
*Assistant Examiner*—Hugh D. Jaeger
*Attorney*—John H. Coult and John J. Pederson

[57] ABSTRACT

A SWIF includes a first transducer that launches acoustic surface waves along a propagating medium. A second transducer responds to those waves by developing an output signal. One or both transducers, certainly at least the output transducer, includes a pair of interleaved combs of conductive material disposed along the propagation path, adjacent teeth of the combs being spaced apart by a center-to-center distance of one-half the acoustic wavelength. Electrically isolated conductive ribbons are disposed individually between the teeth in respective different pairs of adjacent teeth. The center-to-center spacing between each of the ribbons and the ones of the teeth adjacent thereto is one-fourth the acoustic wavelength.

3 Claims, 2 Drawing Figures

SURFACE WAVE FILTER WITH REFLECTION SUPPRESSION

BACKGROUND OF THE INVENTION

The present invention pertains to surface wave integratable filters that have come to be known by the term SWIFs. More particularly, it relates to the reduction of spurious reflection signals that otherwise would result in undesired components in the output from a SWIF.

It has been known that an electrode array composed of a pair of interleaved combs of conducting teeth at alternating potentials, when coupled to a piezoelectric medium, produces acoustic surface waves on the medium. In a simplified embodiment of a piezoelectric ceramic poled perpendicularly to the propagating surface, the waves travel at right angles to the teeth. The surface waves are converted back into electrical signals by a similar array of conductive teeth coupled to the piezoelectric medium and spaced from the input electrode array. In principle, the tooth pattern is analogous to an antenna array. Consequently, similar signal selectivity is possible, thereby eliminating the need for the critical or much larger and more cumbersome components normally associated with frequency-selective circuitry. Thus, such a device, with its small size, is particularly useful in conjunction with solid-state functional integrated circuitry where signal selectivity is desired. A number of different versions of these SWIF devices, together with various modifications and adjustments thereof, are described and others are cross-referenced in U.S. Letters Pat. No. 3,582,840 issued June 1, 1971 and assigned to the same assignee as the present application.

The usual SWIF has a finite distance between its input and output transducers. Hence, a finite time is required for an acoustic surface wave to travel along the path from the input transducer to the output transducer. At that output transducer, part of the acoustic-wave energy is converted to electrical energy and delivered to a load. Another part of the acoustic-wave energy is transmitted past the output transducer where it may be terminated or dissipated. A still further part of the arriving acoustic wave energy is reflected back along the original path toward the input transducer. This reflected surface wave, which is smaller in magnitude than the original surface wave, intercepts the input transducer from which a portion of the wave again is similarly reflected back along the same path to the output transducer where it appears as a diminished replica of the original surface wave. Because of the additional distance of travel, the smaller version of the original surface wave arrives at the output transducer later than that original wave. The time delay is equal to twice the time required for a surface wave to traverse the path from the input transducer to the output transducer. When such a SWIF is used, for example, as a signal-selective device in a television intermediate-frequency amplifier, the triple-transit reflected signal components appear as ghosts in the picture and make it highly undesirable, if not completely unacceptable, for normal viewing.

Known methods for approaching this problem have included optimizing the signal-transducing characteristics of one or both of the input and output transducers, depositing an attenuating material between the input and output transducers and utilizing an additional transducer, spaced from the input and output transducers, responsive to a portion of the original surface wave for generating a still additional acoustic surface wave that at least partially counteracts the undesired acoustic wave originally reflected back from the output transducer. While this last-mentioned technique is an improvement over the first-mentioned approaches, it is basicablly a cancellation scheme in which one undesired component is cancelled by another.

An improvement in the latter respect is disclosed and claimed in the concurrently filed application of Adrian DeVries, U.S. Pat. Ser. No. 235,991, filed Mar. 20, 1972 and assigned to the same assignee as the present application. As there taught, reflection components, arising by reason of mechanical loading of the substrate by a transducer and local electric field shorting caused by the transducer electrodes, are at least reduced by subdividing each "tooth" of the interleaved combs into a pair of conductively connected ribbons spaced apart by one-fourth the acoustic wavelength. For best results, the DeVries transducer is connected to a source or load impedance significantly smaller than the impedance of the transducer itself. It is recognized in the also concurrently filed copending U.S. Pat. application, Ser. No. 235,990, filed Mar. 20, 1972 by Robert Adler and assigned to the same assignee as the present invention, that at least under certain load conditions an additional contributor to the production of reflection components in a transducer of the DeVries type may be electrical loading of the substrate which occurs as a result of electrical shorts created by conductive bars that interconnect different ones of the ribbons. The approach described and claimed in the Adler application seeks to overcome such additional electrical loading by individually connecting the respective ribbons of each adjacent "tooth"-forming pair to correspondingly separate electrical loads. However, the necessity of associating the SWIF with such plural loads and the attendant isolation schemes result in substantial complexity.

OBJECTS OF THE INVENTION

It is a general object of the present invention to provide a new and improved SWIF in which undesired reflected wave components are reduced.

A more specific object of the present invention is to provide a SWIF which in part implements the aforesaid DeVries contribution, while permitting further improvement at least in certain applications.

A particular object of the present invention is to provide a surface-wave filter especially suited for use in association with a comparatively high-impedance source and/or load.

SUMMARY OF THE INVENTION

An acoustic-wave transmitting device constructed in accordance with the present invention includes an acoustic-wave propagating medium. A first transducer responds to input signals by launching along a predetermined path in the medium desired acoustic surface waves that exhibit a predetermined wavelength. A second transducer responds to those desired acoustic waves by developing output signals; it also is capable of responding to triple-transit acoustic surface waves of the same wavelength in the medium for developing undesired output signal components. At least one of the transducers comprises a pair of interleaved combs of conductive material disposed along the propagating path, adjacent teeth of the combs being spaced apart by a center-to-center distance of one-half the predetermined wavelength. Means are included for coupling signals across the combs. Finally, a plurality of electrically isolated conductive ribbons are disposed on the medium across the propagation path and individually between the teeth in respective different pairs of the aforementioned adjacent teeth. The center-to-center spacing between each of the ribbons and the ones of the teeth adjacent thereto is one-fourth the predetermined wavelength.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figures 1, 2:
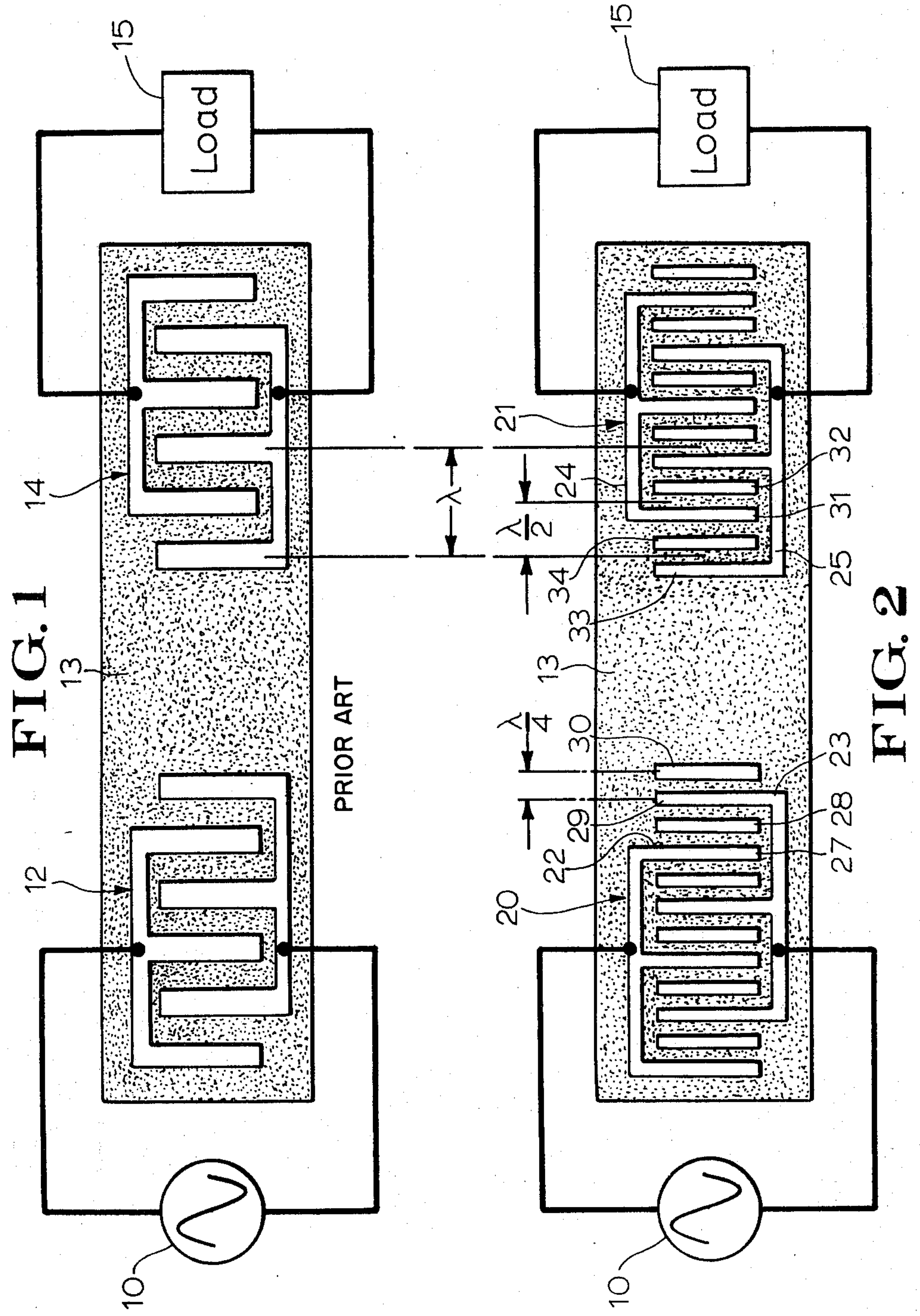
FIG. 1 is a partly schematic plan view of a now-known acoustic-wave transmitting device.
FIG. 2 is a partly-schematic plan view of such a device constructed in accordance with the present invention.

In FIG. 1, an input signal source 10 is connected across an electrode array 12 which is mechanically coupled to a piezoelectric acoustic-wave-propagating medium or substrate 13 to constitute therewith an input transducer. An output electrode array 14 is also mechanically coupled to substrate 13 to constitute therewith an output transducer. Electrode arrays 12 and 14 are each constructed of two interleaved comb-type electrodes of a conductive material, such as gold or aluminum, which may be vacuum deposited on the smoothly-lapped and polished planar upper surface of substrate 13. The piezoelectric material is one, such as PZT or lithium niobate, that propagates acoustic surface waves.

In operation, direct piezoelectric surface-wave transduction is accomplished by input transducer 12. Periodic electric fields are produced across the comb array when a signal from source 10 is applied to the electrodes. These fields cause perturbations or deformations of the surface of substrate 13 by piezoelectric action. Efficient generation of surface waves occurs when the strain components produced by the electric fields in the piezoelectric substrate substantially match the strain components associated with the surface-wave mode. These mechanical perturbations travel along the surface of substrate 13 as generalized surface waves representative of the input signal.

Source 10 might, for example, be the radio-frequency portion of a television receiver tuner that produces a range of signal frequencies. However, due to the selective nature of transducers 12 and 14, only a particular frequency and its intelligence carrying sidebands are converted to surface waves. Those surface waves are transmitted along the substrate to output transducer 14 where they are converted to an electrical signal for transmission to a load 15 connected across the two interleaved combs in output transducer 14. In this example, load 15 represents a subsequent radio-frequency input stage of the tuner such as the heterodyne converter which downshifts the signal frequency to an intermediate frequency. Utilizing lithium niobate as the substrate material in the example, the teeth of both transducers 12 and 14 are each about 4 microns wide and are separated by a center-to-center spacing of 8 microns for the application of a radio-frequency signal in standard program channel 13 within which the video carrier is located at 211.25 mHz. The spacing between transducer 12 and transducer 14 is on the order of 60 mils and the width of the wavefront is approximately 0.1 inch.

The potential developed between any given pair of successive teeth in electrode array 12 produces two waves travelling along the surface of substrate 13, in opposing directions, perpendicular to the teeth for the illustrative case of a piezoelectric ceramic substrate which is poled perpendicularly to the surface. When the center-to-center distance between the teeth is one-half of the acoustic wavelength of the wave at the desired input signal frequency, the so-called center or synchronous frequency, relative maxima of the output waves are produced by piezoelectric transduction in transducer 12. For increased selectivity, additional electrode teeth are added to the comb patterns of transducers 12 and 14. Further modifications and adjustments are described and others are cross-referenced in the aforementioned Letters Patent for the purpose of particularly shaping the response presented by the filter to the transmitted signal. Techniques are also there mentioned for attenuating or advantageously making use of the one of the two surface waves that travels to the left from transducer 12 in FIG. 1. It will suffice for purposes of understanding the present invention to consider only the acoustic surface waves that travel to the right from transducer 12 in the direction toward transducer 14.

As mentioned in the introduction, not all of the acoustic energy arriving at transducer 14 is converted to electrical energy. Part of the acoustic energy is reflected back along the original path. That is, when the surface wave travelling to the right from input transducer 12 intercepts output transducer array 14, a reflected surface wave is created. The reflected surface wave travels along a return path where a portion again is similarly reflected back in a third transit along the propagating medium toward output transducer 14. Consequently, a diminished replica of the original surface wave arrives at the output transducer later than the original wave. This is commonly called a triple-transit signal. The time delay of the diminished replica is equal to twice the amount of time required for a surface wave to traverse the path initially from the input transducer to the output transducer. It is this diminished replica which constitutes spurious acoustic-surface-wave energy that produces undesired output signal components such as the aforementioned "ghosts."

To the end of reducing the development of such reflected energy, each finger or tooth of the interleaved conductive combs in the transducers of the embodiment of FIG. 2 is physically subdivided and one of the subdivisions is electrically isolated. That is, one of the subdivisions of each tooth is left unconnected from the spine of the associated conductive comb. The device of FIG. 2 includes an input transducer 20 and an output transducer 21. Input transducer 20 is composed of a pair of interleaved combs 22 and 23 of conductive material. Similarly, output transducer 21 is composed of a pair of interleaved combs 24 and 25.

In the drawing, transducers 20 and 21 of FIG. 2 are intended to exhibit maximum response at about the same frequency as the respective transducers 12 and 14 in FIG. 1. Thus, the effective interdigital tooth spacing is the same in both figures. However, in the FIG. 2 version, that which corresponds to a single finger or tooth in a transducer of FIG. 1 is subdivided or separated into an adjacent pair of successive ribbons. That is, each "tooth" of comb 22 is subdivided into a pair of ribbons 27 and 28, while each such "tooth" of interleaved comb 23 is similarly subdivided into a pair of ribbons 29 and 30. Similarly in output transducer 21, each "tooth" of comb 24 is subdivided into a pair of ribbons 31 and 32, while each "tooth" of comb 25 is likewise subdivided into a pair of ribbons 33 and 34.

As indicated on the drawing, the individual different ribbons are spaced one from the next by a center-to-center distance of one-fourth the acoustic wavelength at the desired frequency of maximum response. Source 10 and load 15 are coupled across one ribbon in each of adjacent pairs of the successive ribbons. That is, the signals are coupled only across alternate ones of the ribbons that straddle the others of the ribbons. Moreover, the center-to-center distance between all such adjacent pairs is one-half the acoustic wavelength. Further, the center-to-center spacing between each two adjacent sets of ribbon pairs on the same comb is one acoustic wavelength. By comparison of FIGS. 1 and 2, it will be observed that, as between the two combs in each transducer, the overall repetitive spacing is the same. As a result, the frequencies of maximum response are about the same, as already indicated. However, the subdivisions of the individual "teeth" in transducers 20 and 21 and the effective quarter-wavelength spacing between the subdivisions yield cancellation of reflected waves.

Perhaps to better understand the principles involved, reference may again be had to FIG. 1. A wave approaching transducer 14 has a first portion reflected by the first transducer tooth encountered. Another portion is similarly reflected by the second tooth encountered. These reflections arise because each tooth mechanically loads the substrate and also because each tooth locally shorts the directly underlying electric fields. Noting that there is a half-wavelength spacing between those two teeth, the portion of the original wave that travels past the first tooth and on to the second tooth and then is reflected backwards once again to the first tooth will be seen to have travelled an additional total of one wavelength. Thus, both reflected portions leaving the first tooth back toward transducer 12 are in phase and thereby augment one another. While both calculations and experimentation have shown that the magnitude of the reflections is affected to some extent by the impedance of the connected load, such studies also reveal that the reflection coefficient is substantial throughout the desired passband of desired response for all possible load conditions.

Returning to FIG. 2, a portion of an acoustic wave arriving at transducer 21 from transducer 20 is reflected by ribbon 33. Another portion of that same wave subsequently is reflected by ribbon 34. Again, these reflections arise by reason of mechanical loading and local field shorting. In travelling from ribbon 33 to ribbon 34 and back, that second portion in this case has travelled one-half additional wavelength. Accordingly, on leaving transducer 21 and travelling on back toward transducer 20, the wave portion reflected from ribbon 34 is displaced in phase by 180° relative to the wave portion directly reflected from ribbon 33. Therefore, these two different portions tend to cancel each other. As a result, the total amount of reflected energy in the device is reduced. As so far described, the reflection reduction mechanism is similar to that in the arrangement of the transducers in the aforesaid DeVries application. In that case, however, other effects necessitate use of a comparatively small load impedance in order to lower significantly all reflection effects. In the present case, other effects make it preferable to employ what essentially is an opposite approach.

When either of transducers 20 and 21 is shorted, it presents a spatially repetitive, conductively connected pattern having a one-half wavelength spacing. In consequence of currents flowing between connected ribbons, it produces reflections that exhibit a sin $x/x$ frequency response, with a main lobe having a bandwidth which is 50 percent of that of the frequency response of the transducer. On the other hand, the reflections are zero at the synchronous frequency when the transducer is open-circuited. The voltage difference between successive ribbons affixed to the same comb spine is then zero, so that there is no current flow in the spines that would constitute an electrical short of the fields. Any reflections due to currents confined in the individual ribbons, or due to mechanical loading of the substrate by the ribbons, are cancelled by the mechanism described in the preceding paragraph.

Even with a finite load impedance as is usually present in practice, the amount of reflection from a transducer of FIG. 2 is comparatively small so long as the load impedance is large relative to the transducer impedance. For optimum power transfer, of course, the source or load impedance would be made equal to the impedance of the associated transducer. In the present case, however, the reflection coefficient is made to be significantly smaller by deliberately mismatching the transducer and its connected stage. For example, a typical transducer having 40 teeth, spaced apart to exhibit a synchronous frequency in the 40 MHz range, presents an impedance of about 220 ohms. A connected source or load of that impedance results in its exhibiting a reflection coefficient at a given frequency of about 0.3. On increasing the connected impedance to about 820 ohms, the reflection coefficient approaches 0.1. Moreover, the use of a higher connecting impedance results in a fairly flat curve, representing reflection coefficient vs. frequency, throughout the normal operating range of frequencies.

In order, then, to reduce the presence of reflection components arising by reason of electrical shorting of the substrate between different ribbons, each two successive ribbons in FIG. 2 that constitute a pair functioning in the overall as one "tooth" of the basic transducer are electrically isolated one from another. That is, ribbon 34 is electrically isolated from ribbon 33 in the device of FIG. 2. Similarly, ribbon 32 is electrically isolated from ribbon 31. The same separation is accorded all of the other "teeth" of the interleaved combs. The end result is that each transducer, as in the device of FIG. 1, includes a pair of interleaved combs of conductive material with adjacent teeth of the combs themselves being again spaced apart by a center-to-center distance of one-half the wavelength of maximum response. It is across those interleaved combs that the signal source or load, as the case may be, is coupled. In addition, ribbons 28, 30, 32 and 34, as well as the related other similarly positioned ribbons, constitute a plurality of electrically isolated conductors each disposed on the medium across the wave-propagation path and individually being disposed between the comb-teeth in each respective different pair of the adjacent comb teeth. The center-to-center spacing between each of the isolated ribbons and the ones of the comb teeth thereto adjacent is one-fourth the acoustic wavelength of maximum response.

To the extent that substantial reflection cancellation is in the above manner achieved by the subdivision of the "teeth" in transducer 21 and the electrical isolation of the alternate ribbons, it may be unnecessary to employ the improvements in the input transducer. That is, transducer 12 of FIG. 1 may be substituted for transducer 20 of FIG. 2. Where desired, however, both the input and output transducer may be of the special form. By choosing both a high source impedance and a high load impedance, the existence of but a small triple-transit reflection is assured. Any lack of complete reflection cancellation at the output transducer then is attended by a further degree of cancellation on re-reflection from the input transducer back toward the output transducer. In passing, it may be noted that the width of the individual ribbons in transducers 20 and 21 as shown in nominally one-eighth acoustic wavelength. However, this particular dimension is not critical. In operation, the frequency response is approximately the same for the devices of FIGS. 1 and 2 around the fundamental frequency. At harmonics of that frequency, however, differences in the response characteristic will be encountered.

In order to tailor the overall frequency response of the system, it is now known to employ a pair of output transducers in combination. For example, the series combination of two transducers, respectively exhibiting different synchronous frequencies, permits achieving a broadened response. At the same time, each transducer is part of the total load upon the other that may represent a reasonably high-impedance condition. That is, each transducer may assist in presenting a higher total load impedance to the other. In this way, both of the combined transducers may exhibit a low reflection coefficient.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. In an acoustic-wave transmitting device having an acoustic-wave-propagating medium, a first transducer responsive to input signals for launching along a predetermined path in said medium desired acoustic surface waves exhibiting a predetermined wavelength and a second transducer responsive to said desired acoustic waves for developing output signals and also responsive to triple-transit acoustic-surface waves also of said wavelength in said medium for developing undesired output signal components, the improvement in at least one of said transducers comprising:

a pair of interleaved combs of conductive material disposed along said path on said medium with adjacent teeth of said combs being spaced apart by a center-to-center distance of one-half said predetermined wavelength;

means for coupling signals across said combs;

and a plurality of electrically isolated conductive ribbons disposed on said medium across said path and individually between the teeth in respective different pairs of said adjacent teeth, the center-to-center spacing between each of said ribbons and the ones of said teeth adjacent thereto being one-fourth said predetermined wavelength.

2. A device as defined in claim 1 in which said one transducer presents a predetermined impedance and in which said coupling means presents across said combs an impedance significantly higher than said predetermined impedance.

3. In an acoustic-wave transmitting device having an acoustic-wave-propagating medium, a first transducer responsive to input signals for launching along a predetermined path in said medium desired acoustic surface waves exhibiting a predetermined wavelength and a second transducer responsive to said desired acoustic waves for developing output signals and also responsive to triple-transit acoustic-surface waves also of said wavelength in said medium for developing undesired output signal components, the improvement in at least one of said transducers comprising:

an iterative series of conductive ribbons individually disposed on said medium across said path and laterally spaced one from the next by a center-to-center distance of one-fourth said predetermined wavelength;

and means for coupling signals only across alternate ones of said ribbons which are spaced by a center-to-center distance of one-half said predetermined wavelength.

* * * * *